Patented Dec. 11, 1951

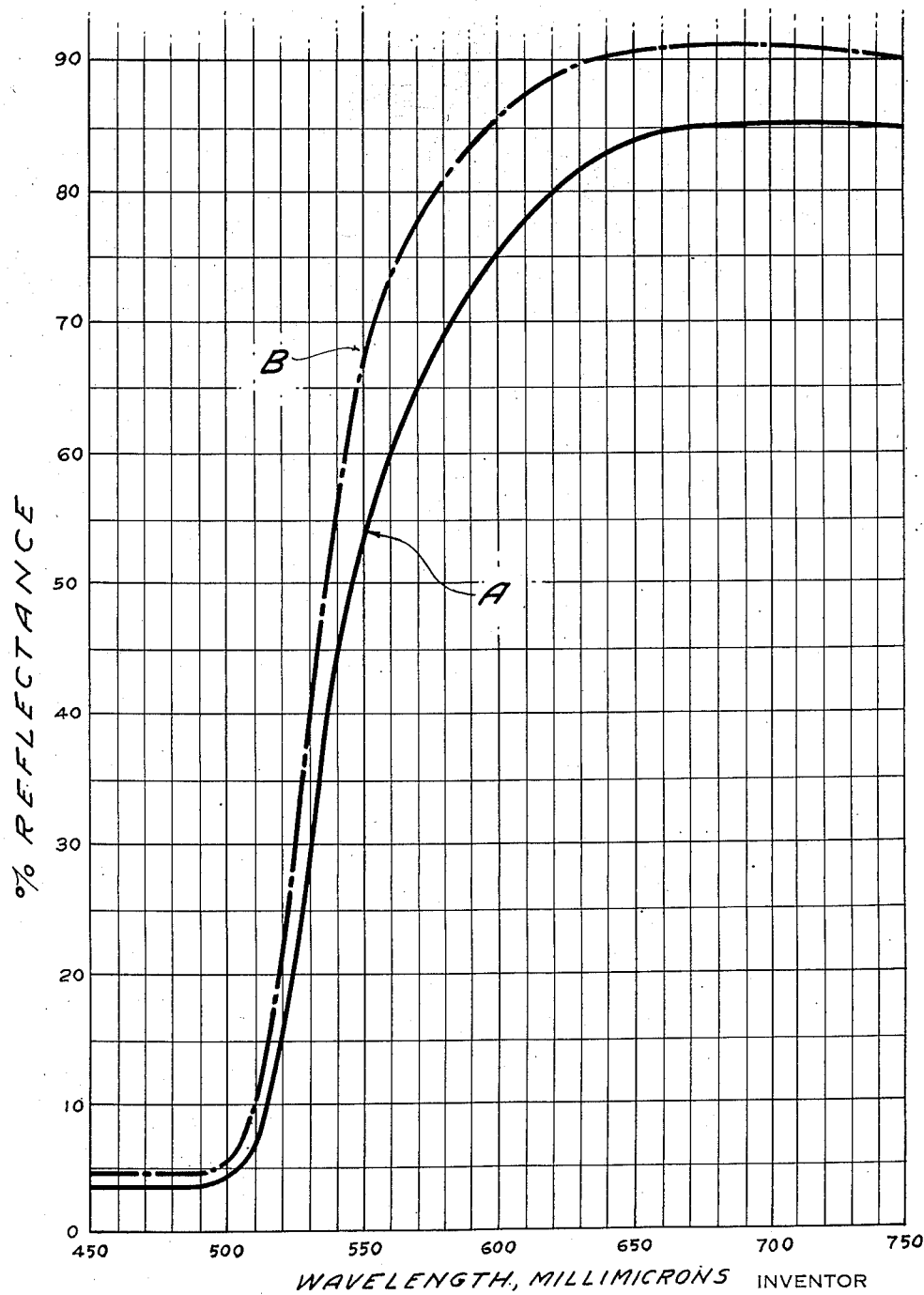

2,578,363

UNITED STATES PATENT OFFICE 2,578,363

CADMIUM SULFIDE PIGMENTS

Guy C. Marcot, Lynchburg, Va., assignor to American Cyanamid Company, New York, N. Y., a corporation of Maine Application June 28, 1946, Serial No. 680,099

7 Claims. (Cl. 106—301)

This invention relates to the production of cadmium pigments and is concerned particularly with an improved method of preparing cadmium sulfide adapted on calcination to yield pigments and especially cadmium yellow pigments of optimum quality.

As used in the present invention, the term "cadmium yellow pigments" is used to designate any of a variety of calcined products containing cadmium sulfide as the principal pigmented component. The term is used to include not only the so-called "pure" type, which is principally cadmium sulfide, but also types in which another sulfide, such as zinc sulfide, is combined therewith during calcination as well as types containing a simple extender, such as barium sulfate.

Cadmium pigments are not new in and of themselves, having been prepared for many years by one or more different procedures. These prior art processes of preparing cadmium yellow, for example, differ principally in the manner in which the cadmium sulfide component of the crude to be calcined is prepared. In general, an aqueous solution of a water-soluble cadmium salt is first prepared, usually by dissolving cadmium metal in a suitable acid. Subsequently, a strike is carried out with this cadmium salt solution and a solution of an alkaline-earth sulfide, usually barium sulfide, whereby the cadmium sulfate is converted to the sulfide.

Where a pure cadmium sulfide reactant is desired, however, this somewhat limits the procedure. Barium and the other alkaline-earth metals produce a number of essentially insoluble salts, the sulfate for example. As a consequence, the cadmium salt used must be of an acid which yields a soluble alkaline-earth metal salt, such as the nitrate or the chloride. In the past, therefore, commercial practice has been principally concerned with the use of cadmium nitrate as the most practical cadmium salt.

On the other hand, the use of cadmium sulfate, if it can be done, would offer a number of advantages. It is the simplest and easiest salt to prepare and the most economical from a raw material cost standpoint. It is the easiest salt to prepare by standard processing procedures in a state relatively free from contaminants. Further, in preparing extended types, co-precipitation of cadmium sulfide and barium sulfate is desirable and cadmium sulfate is ordinarily used. It is quite desirable, therefore, to be able if possible to use in plant practice the same cadmium salt in preparing both pure and extended types. A suitable process for the manufacture of pure type cadmium yellow pigments starting with cadmium sulfate therefore continues to be in demand.

Although the common alkaline-earth metals produce insoluble sulfates, it would appear quite simple to carry out the strike using cadmium sulfate and a sulfide of a metal yielding a soluble sulfate, i. e., the sulfide of sodium or potassium. Unfortunately, this is not the simple exchange of reactants that it appears to be. First of all, cadmium sulfide precipitated with sodium sulfide is very fine in particle size and highly dispersed. Filtration is difficult and an attempt to produce a washed filter cake results in a thixotropic mass which becomes fluid on handling. This in itself is a major production problem.

There is in addition a deleterious effect on the eventual pigment. The cadmium sulfide precipitate carries with it considerable amounts of absorbed or entrained soluble alkali metal salts, principally the sulfate. Such salts cannot be wholly washed out by any ordinary procedure because of the thixotropic nature of the resultant filter cake. Before the soluble salt content is satisfactorily reduced, the slurry becomes so highly dispersed that filtration becomes wholly impractical. Even if washed beyond the point at which filtration is no longer possible in any practical time, the residual salts content is too high. The filter cake is too "sensitive" to calcination, i. e., it sinters badly and is too easily over-burned.

A treatment of the cadmium sulfide slurry with an anti-fluxing agent would seem indicated. One such procedure, treatment with an insoluble phosphate, precipitated in situ with barium or aluminum from added $H_3PO_4$, is shown in my copending application, Serial No. 680,100, now U. S. Patent No. 2,496,588 filed of even date. This procedure is excellent in making cadmium red pigments. However, even this improvement will not overcome the fluxing effect of the residual soluble salts when cadmium sulfide is to be used in preparing cadmium yellow pigments or in preparing "pure" cadmium red pigments in which no cadmium oxide is present. These various factors present problems so serious that in the past it commonly was believed that cadmium yellow pigments of optimum quality could not be prepared by a process employing an alkali metal sulfide.

Nevertheless, the preparation of pure type cadmium pigments by a process in which the cadmium sulfide reactant is obtained from cadmium sulfate remains highly desirable, particularly from a commercial point of view. It is, therefore, the object of the present invention to devise a suitable process whereby the advantages ensuing from the use of cadmium sulfate can be utilized without being subjected to the limitation of producing the inferior pigments, previously considered the inevitable result of using alkali metal sulfides.

Surprisingly, in view of the past history of the art, the principal object of the present invention is quite easily and effectively attained. This is done by end-treating a slurry of cadmium sulfide, prepared from cadmium sulfate and an alkali metal sulfide, with an alkaline-earth metal sulfide or sulfhydrate, the latter being preferable as being less basic.

In general, the process of the present invention is relatively simple. An aqueous solution of cadmium sulfate is prepared, by any desirable method, and cadmium sulfide is precipitated therefrom by a simultaneous strike of the sulfate and an alkali metal sulfide, usually sodium sulfide liquor. It is well to finish the treatment with a separately-added slight excess of sodium sulfide in order to insure complete precipitation.

The resultant slurry is then treated to reduce the soluble salts content and/or the fluxing effect thereof. This is usually best done by washing the pulp as far as possible without encountering excessive trouble with dispersion. Either before or during washing it is advisable to treat the pulp with an anti-fluxing agent. This may be any desired material but is preferably the aluminum salt of my previously-identified application 680,-100, precipitated in situ by adding about 1% $H_3PO_4$ and an equivalent quantity of aluminum salt sulfate.

Finally the resultant treated precipitate is repulped with water and treated with the alkaline-earth metal sulfide or sulfhydrate in accordance with the present invention. Following this treatment the slurry is easily filtered to a cake which in turn is easily dried and on calcination yields a pigment of optimum quality without exhibiting any excessive sensitivity to calcination.

The amount of alkaline-earth metal sulfide or sulfhydrate used should be enough to give a slight excess of alkaline-earth metal ions in the slurry. This does not require a great deal of sulfhydrate liquor. For example, on a mol basis adding about 0.05 mol of $Ba(SH)_2$ per mol of cadmium sulfide usually is a good practice. No definite numerical limitation can be set since a sufficient amount should be used to precipitate all the $(SO_4)^{--}$ ions and still produce a slight excess of alkaline-earth metal ions in the mother liquor.

While another alkaline-earth sulfhydrate such as calcium may be used if so desired, barium is preferable. It produces an insoluble colorless sulfate. While its use results in a small amount of barium sulfate in the final pigment, usually about 3–5% by weight, this is not deleterious. Tinctorially, the product prepared in this way may be superior to those produced by other methods.

Under certain conditions of washing the cadmium sulfide precipitate slurry, it may be possible that the resultant slurry after being repulped following treatment with barium sulfhydrate may still contain a content of alkali metal salts higher than is desirable. These salts may be present due to some reaction such as $$Ba(SH)_2 + Na_2SO_4 \rightarrow BaSO_4 + 2NaSH$$

Presence of the alkali metal salts at this stage, however, is not serious. They may be readily removed or reduced to a controlled quantity by simply controlling the extent of dilution prior to final filtration or by washing the filtering cake after final filtration.

Pigments produced in accordance with the present invention are of excellent quality. The material after calcining is neither excessively sintered nor overburned. On quenching there is no indication of gritty material. Both the mass tone and tint tones of the pigment are greener, brighter and cleaner than any cadmium sulfide pigment previously thought capable of production using an alkali metal sulfide. The pigments are of comparable, and usually better, quality than those commonly produced by the more expensive and less desirable process using cadmium nitrate.

While the above discussion has been primarily concerned with the preparation of cadmium yellow pigments, the invention is also of utility in the preparation of "pure" cadmium red pigments under certain conditions. "Cadmium Red" pigments may be any of a variety of calcined products containing both CdS and cadmium selenide (CdSe.). These red pigments also may be either of "pure" or "extended" types and are obtained by calcining a crude prepared in one of various ways. One such procedure, very commonly used, is that shown for example in U. S. Patent 1,894,931 in which a crude "sulfo-selenide" compound is prepared and forms part of the crude which is calcined. In making pure type compounds by this general procedure, wherein no cadmium oxide or cadmium carbonate constituent is prepared and mixed with other components in making the crude to be calcined, a CdS precipitate, end-treated in accordance with the present invention, is definitely to be preferred.

The invention will be more fully described in conjunction with the following examples which are intended as illustrative only and not by way of limitation. Except as noted, all parts are by weight.

EXAMPLE 1

*Preparation of cadmium sulfide slurry*

Cadmium sulfide was precipitated by a simultaneous strike of 2.35 molar $CdSO_4$ and 1.0 molar $Na_2S$ liquors, the slurry being end pointed with about a 0.05 mol excess of $Na_2S$ per mol of cadmium sulfide. The resultant slurry was treated with 1% (based on the cadmium sulfide weight) of $H_3PO_4$ and an equivalent amount of $Al_2SO_4$ followed by filtration and washing. The cake was repulped with about 12 times its weight of water and filtered, and the filter cake washed. Finally, the washed cake was repulped to a total volume of about twice that previous to filtration and divided into a number of portions, one of these portions being used in each of the following examples.

EXAMPLE 2

One portion of cadmium sulfide slurry produced in accordance with Example 1 was filtered directly without further treatment. Since the slurry was highly dispersed, the filtration rate was very poor and the filter cake was of such thixotropic nature as to be extremely difficult to handle. The filter cake was dried and calcined at its optimum, i. e., over five minutes, from an initial temperature of 800° F. to a final temperature of 1000° F.. The quenched material was extremely gritty. The calcined mass was considerably sintered and overburned. As a pigment it is decidedly inferior to the better grades of cadmium yellow pigments commercially available. It was brown and dirty in mass tone and its tint tone was weak and brownish. A spectrophotometric curve of the mass tone is shown in the accompanying drawing as curve A.

EXAMPLE 3

Another portion of the cadmium sulfide slurry prepared as in Example 1 was treated with barium sulfhydrate in the proportions of 0.03 mol per mol of cadmium sulfide. This amount was sufficient to produce a flocculated slurry which filtered readily but which contained no excess of $Ba^{++}$ ions. Actually an excess of $(SO_4)^{--}$ ions was present in the mother liquor. The filter cake was dried, calcined over 10 minutes from an initial tmperature of 800° F. to a final temperature of 1000° F. and quenched, yielding a somewhat gritty product. As a pigment calcined material, while better than that of Example 2, it was still deficient both as to the desired mass tone and tint tone.

EXAMPLE 4

Another portion of the cadmium sulfide slurry prepared as in Example 1 was treated with sufficient $Ba(SH)_2$ liquor to eliminate the $(SO_4)^{--}$ ions from the mother liquor but insufficient to produce an excess of $Ba^{++}$ ions. The filter cake was dried, calcined over 10 minutes from 800° F. to 1050° F. and quenched. The product was only very slightly gritty and as a pigment is considerably better in mass tone and tint tone than that of Example 3.

EXAMPLE 5

Another portion of the cadmium sulfide slurry prepared in Example 1 was treated with a sufficient amount of $Ba(SH)_2$ to insure a slight excess of $Ba^{++}$ ions in the mother liquor after filtration. This required about 0.05 mol per mol of cadmium sulfide. The slurry was excellently flocculated and filtered easily. The filter cake was again dried and calcined over 10 minutes from about 1000° F. to 1200° F. and quenched. The product was entirely free from gritty material despite the higher temperature of calcination. As a pigment it is greener, brighter and cleaner than any of those of the preceding examples. Both in mass tone and tint tone it is the full equivalent, if not better than pigments produced by other commercial methods. A spectrophotometric curve of the mass tone of the resultant pigment is shown on the drawing as curve B.

I claim:

1. In preparing cadmium pigments, the improved process of preparing a cadmium sulfide reactant which comprises: preparing an aqueous cadmium sulfate solution, precipitating the cadmium content therefrom with an alkali metal sulfide, washing the content of alkali metal sulfate in the resultant precipitate to below about 5 mol percent of the cadmium sulfide but stopping the washing before dispersion of cadmium sulfide becomes excessive, forming an aqueous slurry of the washed precipitate, treating the resultant slurry with a sufficient amount of a member selected from the group consisting of the alkaline-earth metal sulfides and sulfhydrates to produce an excess of alkaline-earth metal ions in the mother liquor on filtration whereby alkaline-earth metal sulfate in amount equivalent to the alkali metal sulfate content is precipitated, and collecting the resultant mixed precipitate of cadmium sulfide containing about 3–5% by weight thereof of the alkaline-earth metal sulfate.

2. A process according to claim 1 in which an antifluxing agent comprising an insoluble orthophosphate is added before the washing of soluble sulfate from the cadmium sulfide precipitate.

3. A process according to claim 1 in which an antifluxing agent comprising an insoluble orthophosphate is added during washing of soluble sulfate from the cadmium sulfide precipitate.

4. A process according to claim 1 in which the alkaline-earth metal is barium.

5. A process according to claim 1 in which an antifluxing agent comprising an insoluble orthophosphate is added and the alkaline-earth metal is barium.

6. In preparing cadmium yellow pigments in which cadmium sulfide is the principal colored constituent, the improvement which comprises: preparing an aqueous cadmium sulfate solution, precipitating the cadmium content therefrom with an alkali metal sulfide, washing the content of alkali metal sulfate in the resultant precipitate to below about 5 mol percent of the cadmium sulfide but stopping the washing before the dispersion of cadmium sulfide becomes excessive, forming an aqueous slurry of the washed precipitate, treating the resultant slurry with a sufficient amount of a member selected from the group consisting of the alkaline-earth metal sulfides and sulfhydrates to produce an excess of alkaline-earth metal ions in the mother liquor on filtration, whereby alkaline-earth metal sulfate in amount equivalent to the alkali metal sulfate content is precipitated, and collecting the resultant mixed precipitate of cadmium sulfide and about 3–5% by weight thereof of the alkaline-earth metal sulfate; drying the collected precipitate, and calcining the dried product.

7. A process according to claim 6 in which the calcination temperature range is from about 1000–1200° F.

GUY C. MARCOT.

REFERENCES CITED

The following references are of record in the file of this patent:

UNITED STATES PATENTS

| Number | Name | Date |
|---|---|---|
| 2,148,194 | Drucker | Feb. 21, 1939 |

FOREIGN PATENTS

| Number | Country | Date |
|---|---|---|
| 299,797 | Great Britain | 1928 |